(12) United States Patent
Lin

(10) Patent No.: US 6,726,210 B2
(45) Date of Patent: Apr. 27, 2004

(54) SEALING DEVICE FOR A GEAR BOX

(75) Inventor: Yu-Hsing Lin, Taichung Hsien (TW)

(73) Assignee: Li Ming Machinery Industrial Co., Ltd., Taichung Hsien (TW)

( * ) Notice: Subject to any disclaimer, the term of this patent is extended or adjusted under 35 U.S.C. 154(b) by 0 days.

(21) Appl. No.: 10/254,220

(22) Filed: Sep. 25, 2002

(65) Prior Publication Data
US 2004/0056426 A1 Mar. 25, 2004

(51) Int. Cl.[7] ............ F01D 11/02; F16J 15/32; F16C 33/76
(52) U.S. Cl. ........ 277/349; 277/351; 277/549; 277/576; 277/577; 277/572; 384/489
(58) Field of Search ............... 277/349, 351, 277/402, 549, 551, 572, 576, 577; 384/482, 489

(56) References Cited

U.S. PATENT DOCUMENTS

| | | | | |
|---|---|---|---|---|
| RE24,940 E | * | 2/1961 | Stephens | ............... 384/482 |
| 3,482,844 A | * | 12/1969 | McKinven, Jr. | ............ 277/349 |
| 4,516,783 A | * | 5/1985 | Mitsue et al. | ............... 384/482 |
| 5,004,248 A | * | 4/1991 | Messenger et al. | ......... 277/351 |
| 5,024,364 A | * | 6/1991 | Nash | ............................ 277/364 |
| 5,944,321 A | * | 8/1999 | Niebling et al. | ............ 277/549 |
| 6,471,211 B1 | * | 10/2002 | Garnett et al. | ............... 277/351 |
| 6,497,514 B2 | * | 12/2002 | Maldera et al. | ............. 384/486 |

FOREIGN PATENT DOCUMENTS

EP 0337893 * 4/1989 ............ F16J/15/32

* cited by examiner

Primary Examiner—Anthony Knight
Assistant Examiner—Vishal Patel
(74) Attorney, Agent, or Firm—Alan Kamrath

(57) ABSTRACT

A sealing device for a gear box includes a box having a hole defined through a wall thereof and a shaft having a first end rotatably engaged with an inside of the box. A second end of the shaft is supported by a bearing which is received in a frame engaged with the hole of the box. A cap is connected to an end of the frame in the box and mounted to the second end of the shaft. A space is defined between a skirt and a protrusion of the cap so as to receive a seal therein. The seal has a flexible plate which is engaged with the end of the frame in the box. The flexible plate effectively prevents oil in the box from entering a gap between the bearing and the frame when the shaft is not rotated.

13 Claims, 5 Drawing Sheets

SEALING DEVICE FOR A GEAR BOX

FIELD OF THE INVENTION

The present invention relates to a sealing device for a gear box and includes a cap mounted to the shaft, and the cap includes a receiving space in which a seal is engaged. The seal prevents oil flowing into the gap between the bearing frame and the bearing.

BACKGROUND OF THE INVENTION

A conventional gear box is shown in FIG. 4 and generally includes a worm rod 20 rotatably received in the box 10. One end of the worm rod 20 is rotatably connected to an inside of the gear box 10, and the other end of the worm rod 20 extends from an opening 11 of the gear box 10. A bearing 60 is engaged with the opening 11 of the gear box 10, and second end of the worm rod 20 is supported by the bearing 60 and connected with a driving shaft. A seal 61 is mounted to the second end of the worm rod 20 and prevents oil in the gear box 10 from leakage. In order to have a better result of sealing, the seal 61 has to be securely mounted to the worm rod 20 while allowing the worm rod 20 to rotate as desired. The friction between the seal 61 and the second end of the worm rod 20 is too large and consumes the energy for driving the worm rod 20. The seal 61 is replaced frequently because of wearing. FIG. 5 shows an improved sealing device which includes a plate 80 mounted to the rotatable shaft 72 in the gear box 70. The plate 80 has a flange 81 which is mounted to a flange 71 extending from an inside of the box 70. A bearing 90 is engaged with a hole defined through the wall of the box 70 and is covered by the plate 80. A seal 91 is mounted to an end of the shaft 72 which extends from the hole of the box 70. The plate 80 separates the oil in the box 70 to prevent the oil from entering the gaps between an inner periphery of the hole and the beating 90 when the rotatable shaft 72 is rotated. The arrangement of the plate 80 does not require the seal 91 to be secured to the rotatable shaft 72, so that the friction between the rotatable shaft 72 and the seal 91 is less than that in the example shown in FIG. 4. Sealing by the plate 80 is not satisfied when the rotatable shaft 72 is not rotated, because the oil may flow over the flange 81 of the plate 80 and then enter into the bearing 90 and the gap between the bearing 90 and the inner periphery of the hole of the box 70.

The present invention intends to provide a sealing device for a gear box wherein a seal is received in a space of a cap so as to prevent the oil flowing into the gap between the bearing and the frame even when the worm rod is not rotated.

SUMMARY OF THE INVENTION

In accordance with one aspect of the present invention, there is provided a sealing device for a gear box, and the device comprises a box having a hole defined through a wall thereof. A shaft has a first end rotatably engaged with an inside of the box, and a second end of the shaft extends through the hole. A frame is engaged with the hole of the box, and a bearing is engaged in the frame. The bearing is mounted to the second end of the shaft. A cap is connected to an end of the frame in the box, and a seal is located inside of the cap. The seal has a flexible plate which is engaged with the end of the frame in the box.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
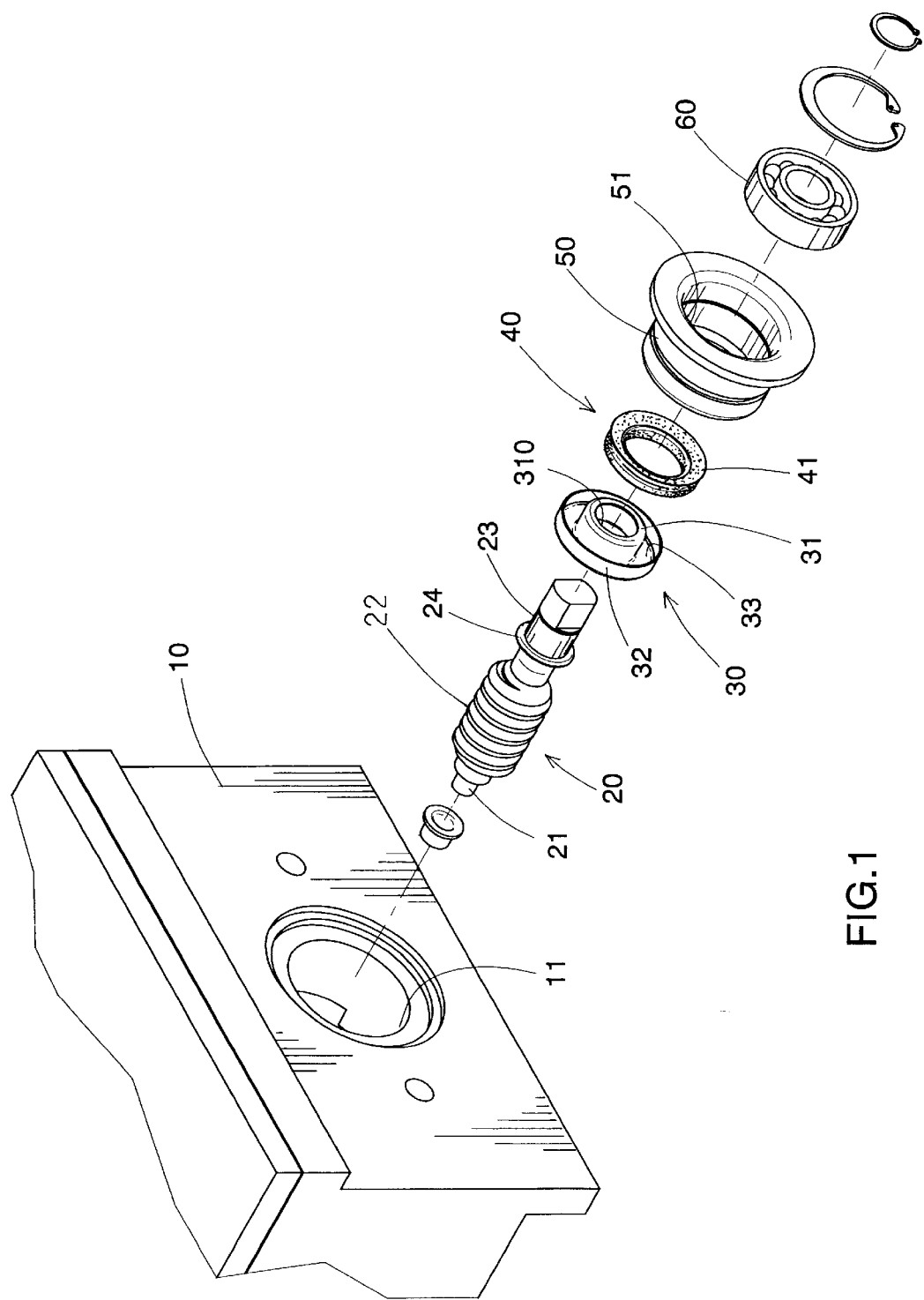
FIG. 1 is an exploded view to show the sealing device of the present invention.
Figure 2:
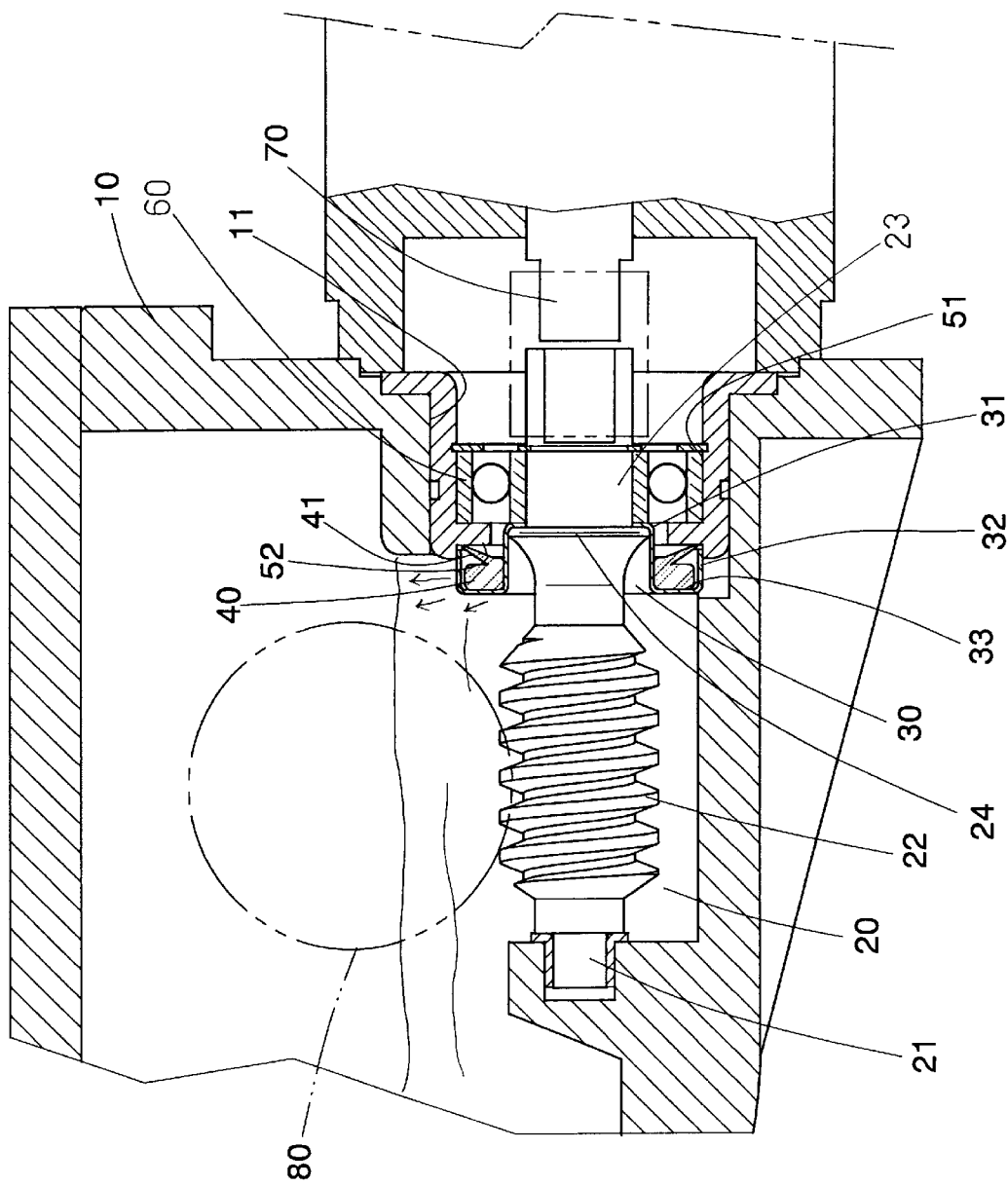
FIG. 2 is a side cross sectional view to show the sealing device of the present invention.

Referring to FIGS. 1 and 2, the sealing device for a gear box of the present invention comprises a box 10 having a hole 11 defined through a wall thereof. A shaft 20, such as a worm rod, has a first end 21 rotatably engaged with an inside of the box 10, and a second end 23 of the shaft 20 extends through the hole 11. The worm screws 22 of the shaft 20 are engaged with a worm gear 80 and transfers the power from the driving shaft 70 to the worm gear 80. A frame 50 is engaged with the hole 11 of the box 10, and a bearing 60 is engaged in a hole 51 of the frame 50. The bearing 60 is mounted to the second end 23 of the shaft 20.

A cap 30 has a protrusion 31 extending from a side thereof, and a hole is defined through the protrusion 31. The second end of the shaft 20 extends through the hole of the protrusion 31. A lip 310 extends from an inner periphery of the hole of the cap 30, and the shaft 20 has a flange 24 extending from an outer periphery thereof. The lip 310 of the cap 30 is engaged with the flange 24 of the shaft 20. A skirt 32 extends from an outer periphery of an annular, radial portion 33 of the cap 30. A recess 52 is defined in the end of the frame 50 in the box 10, so that an outer periphery of the skirt 32 of the cap 30 is engaged with the recess 52. A seal 40 is engaged between the skirt 32 and the protrusion 31, and has a flexible plate 41 which is engaged with the end of the frame 50 in the box 10.

Figure 3:
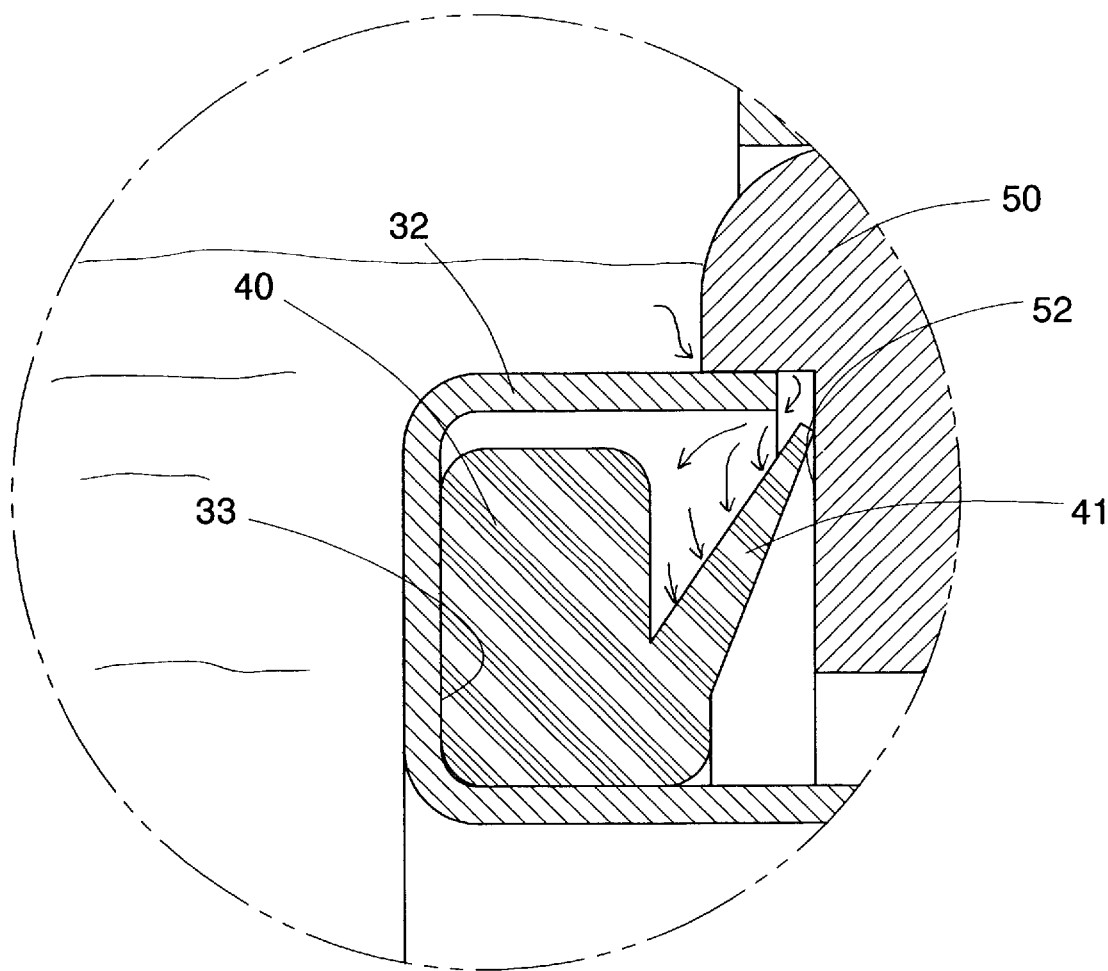
FIG. 3 is an enlarged view to show the flexible plate of the seal contacting the end of the frame in the box.
Figure 4:
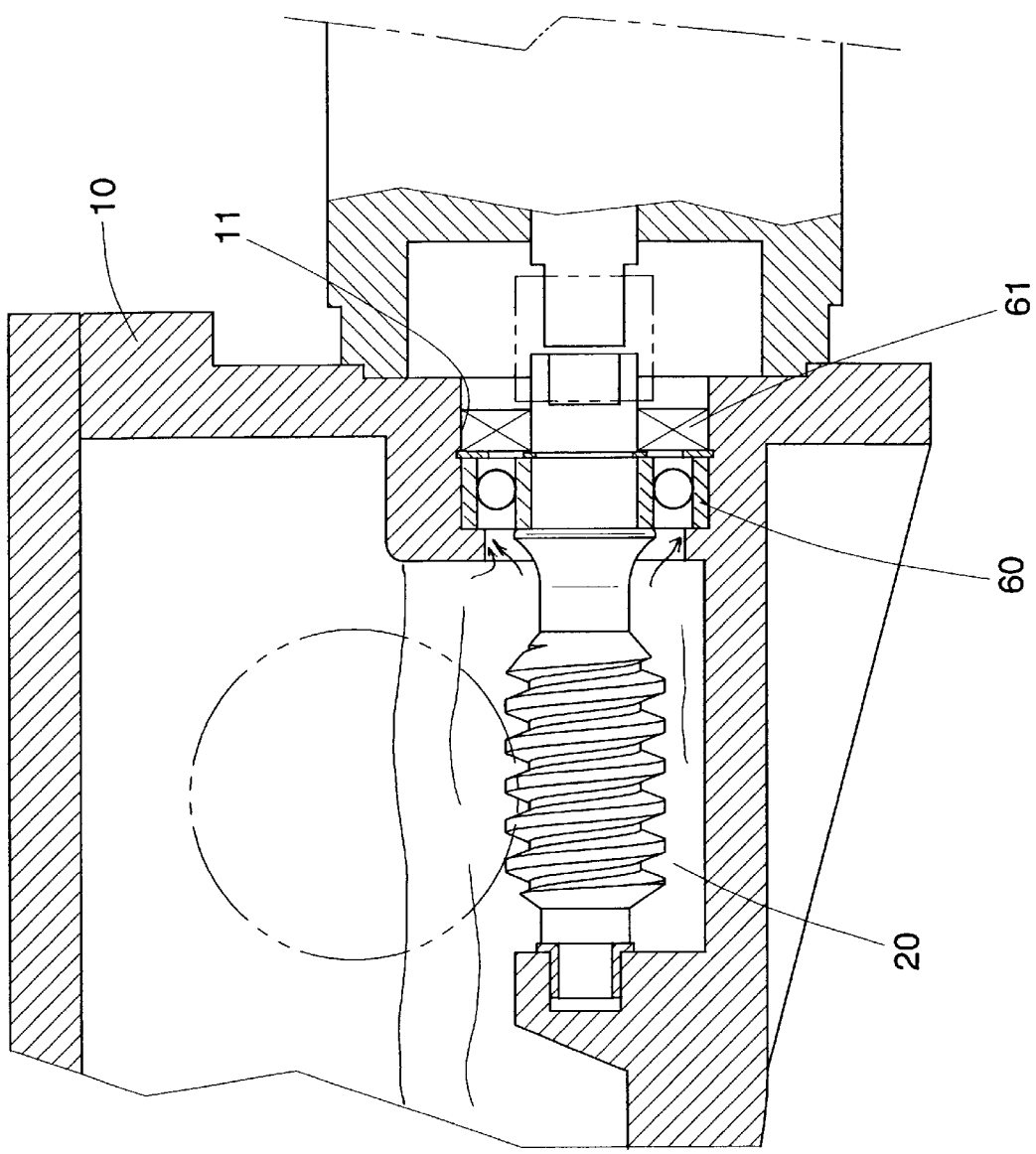
FIG. 4 is a side cross sectional view of a first conventional sealing device for a gear box.
Figure 5:
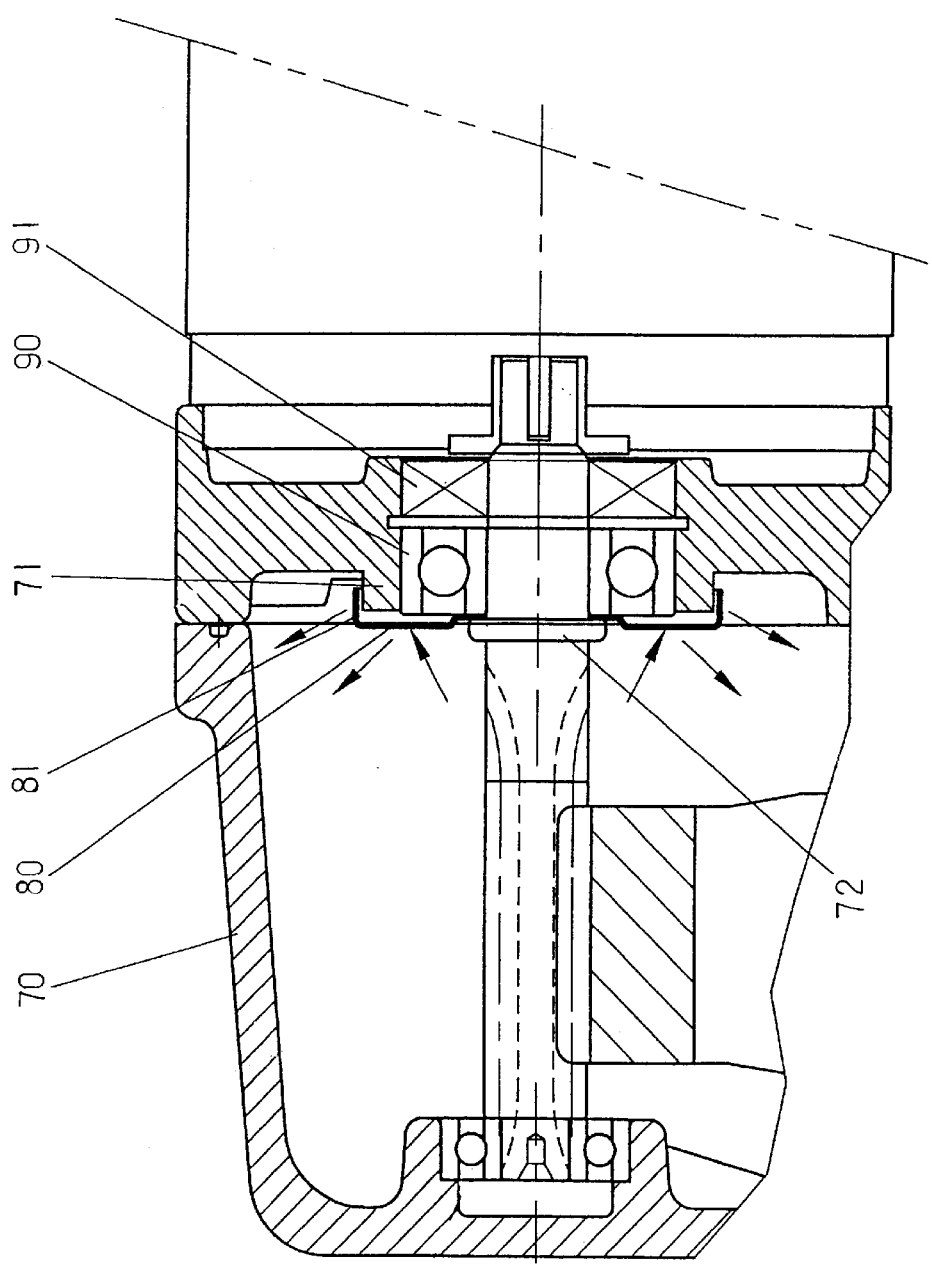
FIG. 5 is a side cross sectional view of a second conventional sealing device for a gear box.

When the shaft 20 is rotated, the cap 30 is co-rotated with the shaft 203 and the oil is splashed away from the bearing 60 so that the possibility of oil leakage is reduced to a minimum. When the shaft 20 is not rotated, referring to FIG. 3, the flexible plate 41 contacts the inside of the end of the frame 50 in the box 10, such that the oil is stopped by the flexible plate 41 from entering into the bearing 60.

While the embodiment has been shown and described in accordance with the present invention, it should be clear to those skilled in the art that further embodiments may be made without departing from the scope of the present invention.

What is claimed is:

1. A sealing device for a gear box, comprising:
   a box having a hole defined through a wall thereof and a shaft having a first end rotatably engaged with an inside of the box and a second end of the shaft extending through the hole;
   a frame having an end engaged with the hole of the box and a bearing engaged inside the frame, with the bearing mounted to the second end of the shaft;
   a cap connected to an end of the frame in the box and having a protrusion and a hole defined through the protrusion, with the second end of the shaft extending through the hole of the protrusion, with the cap further having a skirt positioned around the protrusion, with the skirt having an outer periphery engaged with the frame; and a seal engaged between the protrusion and the skirt of the cap, and engaged with the end of the frame in the box.

2. The sealing device as claimed in claim 1, wherein the shaft has a flange extending from an outer periphery thereof so as to be engaged with the cap, with the cap sandwiched between the flange and the bearing engaged inside of the frame and mounted to the second end of the shaft.

3. The sealing device as claimed in claim 1 further comprising a recess defined in the end of the frame inside the box, with the outer periphery of the skirt of the cap engaged with the recess.

4. The sealing device as claimed in claim 3 with the seal having a flexible plate which is engaged with the end of the frame in the box.

5. The sealing device as claimed in claim 4, wherein the shaft has a flange extending from an outer periphery thereof so as to be engaged with the cap, with the cap sandwiched between the flange and the bearing engaged inside of the frame and mounted to the second end of the shaft.

6. The sealing device as claimed in claim 2 with the seal having a flexible plate which is engaged with the end of the frame in the box.

7. The sealing device as claimed in claim 1 with the seal having a flexible plate which is engaged with the end of the frame in the box.

8. A sealing device for a gear box, comprising:

a box having a hole defined through a wall thereof and a shaft having a first end rotatably engaged with an inside of the box and a second end of the shaft extending through the hole;

a frame having an end engaged with the hole of the box and a bearing engaged inside the frame, with the bearing mounted to the second end of the shaft, with the end of the frame including an end surface that is perpendicular to an axis of the shaft;

a cap connected to the end of the frame and having a hole defined therethrough, with the second end of the shaft extending through the hole of the cap; and a seal engaged inside the cap, with the seal having a flexible plate which is engaged with the end surface of the end of the frame in the box.

9. The sealing device as claimed in claim 8, wherein the shaft has a flange extending from an outer periphery thereof so as to be engaged with the cap, with the cap sandwiched between the flange and the bearing engaged inside of the frame and mounted to the second end of the shaft.

10. A sealing device for a gear box, comprising:

a box having a hole defined through a wall thereof and a shaft having a first end rotatably engaged with an inside of the box and a second end of the shaft extending through the hole;

a frame having an end engaged with the hole of the box and a bearing engaged inside the frame, with the bearing mounted to the second end of the shaft;

a cap connected to the end of the frame and having a hole defined therethrough, with the second end of the shaft extending through the hole of the cap; and a seal engaged inside the cap, wherein the shaft has a flange extending from an outer periphery thereof so as to be engaged with the cap, with the cap sandwiched between the flange and the bearing engaged inside of the frame and mounted to the second end of the shaft.

11. The sealing device as claimed in claim 10 with the seal having a flexible plate which is engaged with the end of the frame in the box.

12. The sealing device as claimed in claim 11 further comprising a recess defined in the end of the frame inside the box and an outer periphery of the cap engaged with the recess.

13. The sealing device as claimed in claim 12 further comprising a recess defined in the end of the frame inside the box and an outer periphery of the cap engaged with the recess.

* * * * *